Patented Oct. 23, 1923.

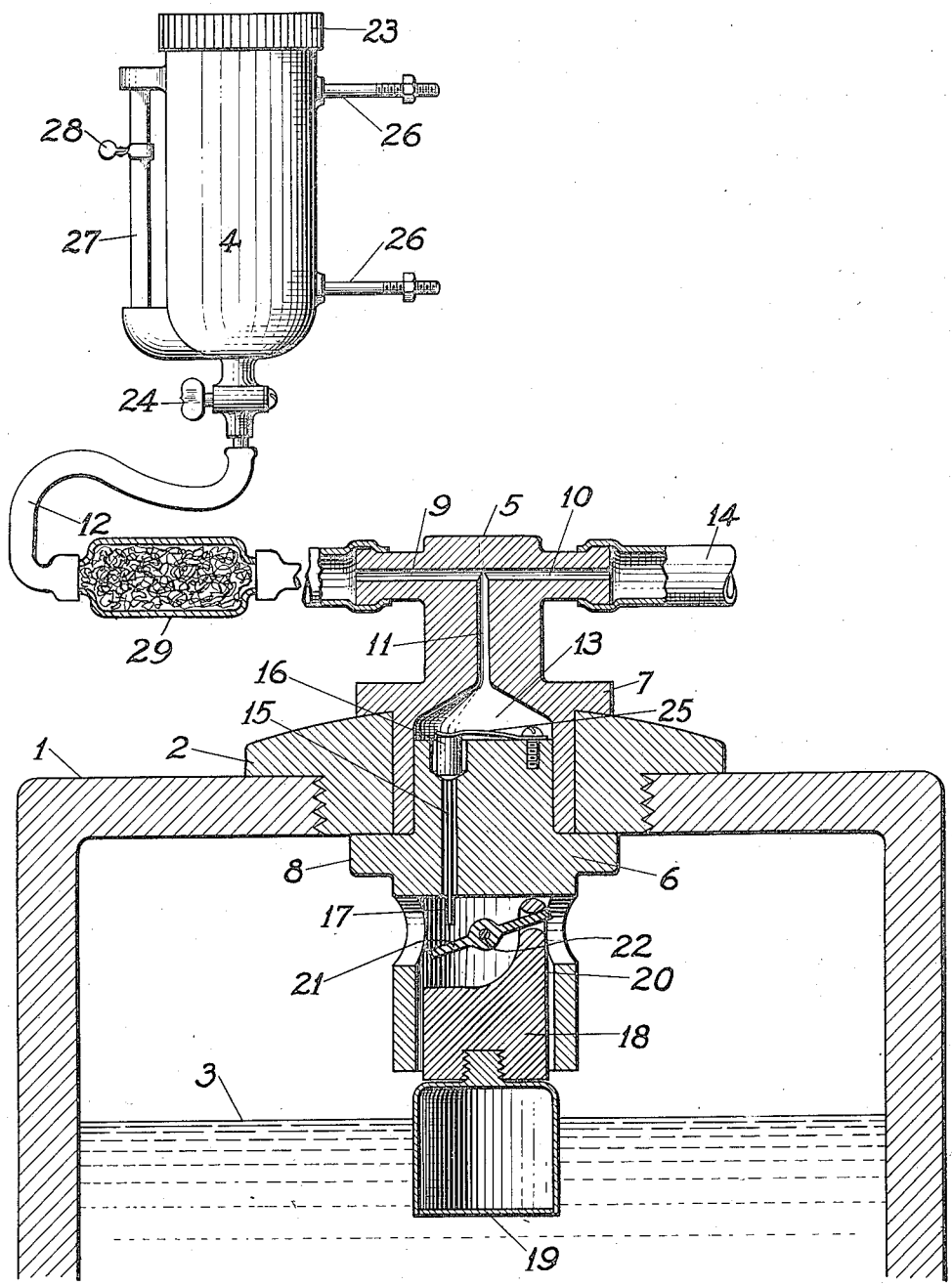

1,471,362

UNITED STATES PATENT OFFICE.

JACK D. SARTAKOFF, OF LONG ISLAND CITY, NEW YORK.

STORAGE-BATTERY FILLER.

Application filed November 13, 1919. Serial No. 337,839.

*To all whom it may concern:*

Be it known that I, JACK D. SARTAKOFF, a citizen of Russia, residing at Long Island City, county of Queens, and State of New York, have invented a certain new and useful Storage-Battery Filler, of which the following is a specification.

This invention relates to an automatic water feed for storage batteries, particularly those used on automobiles and other self-propelled vehicles. Such vehicles are generally provided with a storage battery or accumulator embodying a plurality of cells charged with a suitable electrolyte. Because of evaporation leakage, etc., this electrolyte requires replenishing from time to time in order that it may fully submerge the plates of the accumulator and it is the usual practice to replenish the electrolyte by adding thereto at predetermined intervals, when necessary, small quantities of distilled water. In my applications Serial Nos. 267,586 and 308,057, means is described and shown in order that the electrolyte may be automatically maintained at a predetermined uniform level. The inventions of these prior applications embody structures which are automatically controllable by the water level in the cell or accumulator and as the water level falls the replenishing of the cell results automatically. It is found in practice, however, that, while these prior structures do all that is claimed for them, they are apt to overdo it and bring about a flooding of the cell. That is to say, the vibration present when a vehicle is in motion precludes the proper seating of the inlet valve by the float and allows more water to flow into the cell than is absolutely required. This is due to the fact that in both of the prior constructions the float carries the valve sealing member and manifestly if the float is bobbing about due to vibration and agitation of the electrolyte that it cannot form a firm, liquid impervious seat.

With the foregoing considerations in mind, the object of this invention is to provide in a system of the general character disclosed in my prior inventions aforesaid, float controlled valve means wherein the flooding of the cell cannot occur and this I preferably accomplish by means of a float which as the liquid level rises, to the predetermined level, serves to allow the seating of a valve but should further inflow of the liquid continue the float will be carried out of co-operative relation to the valve so that the bobbing about of such float, due to vibrations or agitation of the electrolyte, will in nowise effect the valve.

Features of the invention, other than those specified will be apparent from the hereinafter detailed description taken in conjunction with the accompanying drawings.

In the accompanying drawings, I have illustrated diagrammatically one practical embodiment of the invention, a portion of one cell of an accumulator being shown in section together with the feed controlled means associated therewith, while, in elevation, I have shown a reservoir from which the electrolyte is replenished. The construction shown in the drawings is, however, to be understood as illustrative only and not as defining the limits of the invention.

Referring to the drawings 1 designates a storage battery or accumulator which, in practice is usually composed of three or more cells, only one of which is shown in the drawings. It will be understood that the construction illustrated with reference to the cell shown will be duplicated for each of the remaining cells.

Each cell is provided with the usual screw cap 2 and interiorly houses a plurality of plates (not shown) which are immersed in a suitable electrolyte 3.

Supported in the screw cap 2 of each cell is means for introducing electrolyte into the battery for the purpose of replenishing the same from a supply reservoir 4. This means, in the form shown, embodies two telescoping members 5 and 6 provided with flanges 7 and 8 respectively, and these members are telescoped into one another from the opposite sides of the screw cap 2 so as to tightly clamp the screw cap between the flanges 7 and 8. The parts 5 and 6 may be screwed together if desired or may be glued, pinned or otherwise secured together. In any event, the two parts 5 and 6 are securely mounted on the screw cap and may be removed from or positioned in operative relation to the accumulator 1 by screwing in the cap 2 in the usual manner. The upper section 5 is provided with passage ways 9, 10 and 11, the passage 9 being in communication with the supply reservoir 4 preferably through a flexible tube 12, the passage 11 communicating with the chamber 13 in the upper section 5, and the passage 10 communicating through a flexible connection 14 with a section corresponding to the section 5 but mounted on the next cell of the accumulator.

The electrolyte fed from the reservoir 4 through the tube 12 into the chamber 13 is adapted to flow through a passage 15, formed in the section 6, into the cell, and the flow of the electrolyte through the passage 15 is controlled by a valve 16 which seats in the upper portion of the passage and is provided with a stem 17 projecting below the lower end of said passage. The lower end of the section 6 is in the form of a tubular guideway which guides the movement of an operating member 18, the lower end of which is secured to a float 19. The upper end of the operating member 18 is in the form of a yoke 20 which loosely embraces one arm of a lever 21, the other arm of the lever underlies the stem 17 of the valve and the lever is pivoted at 22 as shown. In the accompanying drawings, the operating member 18 and the float 19 are shown as two separate elements secured together but in practice the yoke 20 may be formed directly on the float 19 if desired.

Float 19 may be made of any suitable material and in any desired manner without departing from the spirit of this invention, but in practice I preferably form said float of wood hollowed out as shown.

In the operation of the invention as described the reservoir 4 is filled with distilled water or other electrolyte by removing a cap 23 with which it is provided for this purpose and thereafter the plug cock 24 which controls the flow of liquid from the reservoir, is turned to the open position shown whereupon the invention is susceptible to the performance of its functions. The electrolyte in the cells being at the proper level, the float 19 is in the position shown in the drawings and the valve 16 is seated. If, through evaporation, leakage or otherwise, the level of the electrolyte recedes, the float 19 is simultaneously lowered until the yoke 20 engages with one arm of the lever 21. Upon further recession of the electrolyte the weight of the float and operating member 18 is imposed upon the lever and tilts it into engagement with the valve stem 7 with the result that said lever exerts an upward thrust on the valve stem 17 and forces the valve 16 off of its seat, so that electrolyte may flow into the cell to replenish the same. As the electrolyte flows into the cell, the level is again raised to a predetermined height and the float 19 rises carrying the yoke 20 free from the lever 21 which, in turn, frees the valve stem 17 and allows of the seating of the valve 16.

In practice, when the water starts to enter the battery cell and the electrolyte level rises, the float does not rise with each slight change of level but, due to friction, does not rise until sufficient pressure of solution acts upon it to overcome friction, etc. When this occurs the float shoots up, so to speak, and disengages the lever from the bottom of valve stem 17 much further than is necessary to merely allow the valve to seat. So much clearance is provided, as shown in the drawings, that ordinary washing of the solution or vibration will not affect the position of the valve, such as would occur if the lever were to come in contact with the same. It will thus appear that there can be no flooding of the cell when the present invention is employed. I have shown a leaf spring 25 associated with the valve 16 to normally hold it to its seat and any other type of spring may be employed for such purpose if desired though in practice a spring is non-essential.

In order to facilitate the mounting of the reservoir 4 in position on a vehicle, the same is provided with a pair of threaded posts 26 and said reservoir is further preferably provided with a gage glass 27. With this gage glass, I preferably associate an adjustable indicator 28 which is slidable longitudinally of the glass but may be clamped in any desired position. By the adjustment of the indicator 28, the amount of water used over any predetermined period may be readily noted and the operator may better determine how often the reservoir 4 should be recharged.

In practice, it is preferred to include in the hose or tube connection 12 a filter 29 shown in the drawing in the form of a container filled with any suitable filtering agent through which the water flowing from the reservoir 4 is required to pass before entering the upper section 5. This filter besides filtering out the impurities in the water serves to hold back the hydrostatic pressure of the liquid in the reservoir 4 so that such hydrostatic pressure is not imposed directly upon the valve 16 and said valve need not necessarily be ground therefor to such a tight fit as would be required if the water delivered thereto were under pressure. The arrangement shown is preferred although the filter is not absolutely essential to the operation of the device.

Having thus fully described the invention, what I claim as new and desire to secure by Letters Patent is:

1. An attachment for conventional battery cells embodying a closure cap adapted to screw into the tapped filler cap hole of a conventional cell and provided with an aperture therein, a pair of telescoping sections each provided with a flange, which sections are telescoped into one another from the opposite sides of the cap for mounting and supporting the sections in assembled relation on said cap, means for feeding liquid into the interior of the upper section, a duct through which the liquid may flow into the battery, a valve supported on one of said sections, a lever, also supported on one of the sections, for actuating said valve, and a float, controlled by the liquid level of the electrolyte of the cell for actuating the lever to unseat the valve and allow liquid to flow into the cell when the liquid level recedes below a predetermined minimum.

2. An attachment for conventional battery cells embodying a closure cap adapted to screw into the tapped filler cap hole of a conventional cell and provided with an aperture therein, a pair of telescoping sections, each provided with a flange which sections are telescoped into one another from the opposite sides of the cap and through the aperture in the cap for the purpose of mounting the sections in assembled relation on the cap, a duct for feeding liquid into the interior of the upper section, a valve for controlling the flow of such liquid through a passage in the lower section into the cell, a float for controlling said valve, and a cage carried by the lower section and serving to guide the operations of the float, whereby said sections, valve and float are all carried on and supported by the cap and may be associated with the conventional cell by merely screwing the cap on the cell.

In testimony whereof, I have signed my name to this specification.

JACK D. SARTAKOFF.